July 31, 1962   P. MESICH   3,046,666
MICROMETER
Filed Nov. 24, 1959

INVENTOR.
PAUL MESICH
BY Andrus + Starke
Attorneys

United States Patent Office 3,046,666
Patented July 31, 1962

3,046,666
MICROMETER
Paul Mesich, 2907 N. Downer Ave., Milwaukee, Wis.
Filed Nov. 24, 1959, Ser. No. 855,136
2 Claims. (Cl. 33—164)

This invention relates to a micrometer and more particularly to a micrometer adapted to be used for measuring objects varying considerably in size.

In measuring or gauging articles with a micrometer, individual micrometers are usually employed for each one inch increment. For example, one micrometer may measure from 0 to 1 inch while a second micrometer will measure from 1 inch to 2 inches. Thus, when an operator is measuring an article having one portion falling within the 0 to 1 inch range and the second portion falling within the 1 inch to 2 inch range, it is necessary for him to change micrometers to make the two measurements.

The present invention is directed to a micrometer which can be used for measuring objects varying considerably in size and enables an operator to measure articles from 0 up to 2 or 3 inches or more with the same instrument. More specifically, the micrometer includes a barrel which is formed integrally with the frame and an internally threaded sleeve is slidably mounted within the barrel and locked to the barrel by a lock nut. A spindle, which cooperates with an anvil to measure or gauge the article, is threadedly engaged within the sleeve and a knob on the outer end of the spindle is slidably disposed on the barrel.

With this construction, when the lock nut is released, the sleeve can slide relative to the barrel to move the outer end of the spindle into engagement with the article to be gauged. The fine adjustment for the measurement is then accomplished by rotating the knob and spindle to obtain the final accurate reading.

The micrometer of the invention is of simple construction and is readily adapted to existing micrometers so that existing instruments can be easily converted to embody the elements of the invention.

Due to the sliding connection between the sleeve and the barrel, the amount of movement necessary to measure or gauge the object is substantially reduced. Moreover, with the invention, it is possible to gauge or measure articles of varying size with one instrument which eliminates the handling of two or more different micrometers.

Other objects and advantages will appear in the course of the following description.

The drawings illustrate the best mode of carrying out the invention.

The drawings illustrate a micrometer comprising a generally U-shaped frame 1. One end of the frame is provided with an opening which receives an anvil 2 and the other end of the frame is formed integrally with a tubular barrel 3 which is disposed in axial alignment with the anvil 2.

Figure 3:
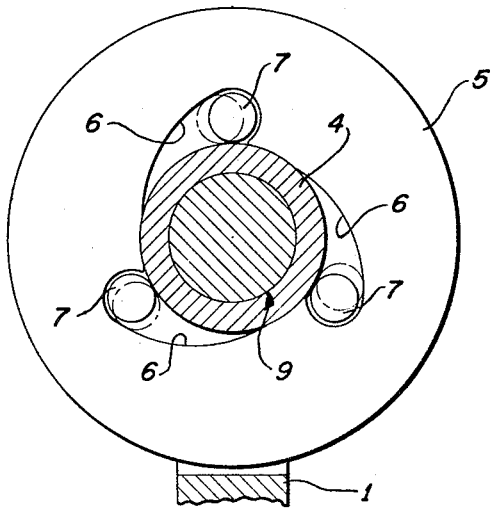
FIG. 3 is a transverse section taken along line 3—3 of FIG. 2.

An internally threaded sleeve 4 is slidably disposed within the barrel 3 and is locked therein at any axial position by a lock nut 5 which is disposed within a circumferential recess in the barrel. As best shown in FIG. 3, the interior surface of the lock nut 5 is provided with a plurality of recesses 6 of progressively varying depth. Each recess receives a roller 7 and by rotating the lock nut with respect to the barrel, the rollers are forced into the narrow end of the respective recesses to lock the sleeve 4 with respect to the barrel 3.

To limit the outward movement of the sleeve within the barrel, a stop nut 8 is threadedly engaged within the outer end of the barrel and prevents outward displacement of the sleeve.

A spindle 9 is provided with a threaded portion 10 which is threadedly engaged with the interior surface of sleeve 4. The inner end 11 of the spindle 9 is adapted to cooperate with the anvil 2 and measure or gauge an article disposed therebetween.

The outer end portion 12 of the spindle 9 is reduced in diameter and extends through a suitable opening in the stop nut 8. A thimble or knob 13 is secured to the outer end of the spindle 9 by a screw 14 and the knob extends axially of the spindle and is slidably disposed on the outer surface of the barrel.

Figure 1:
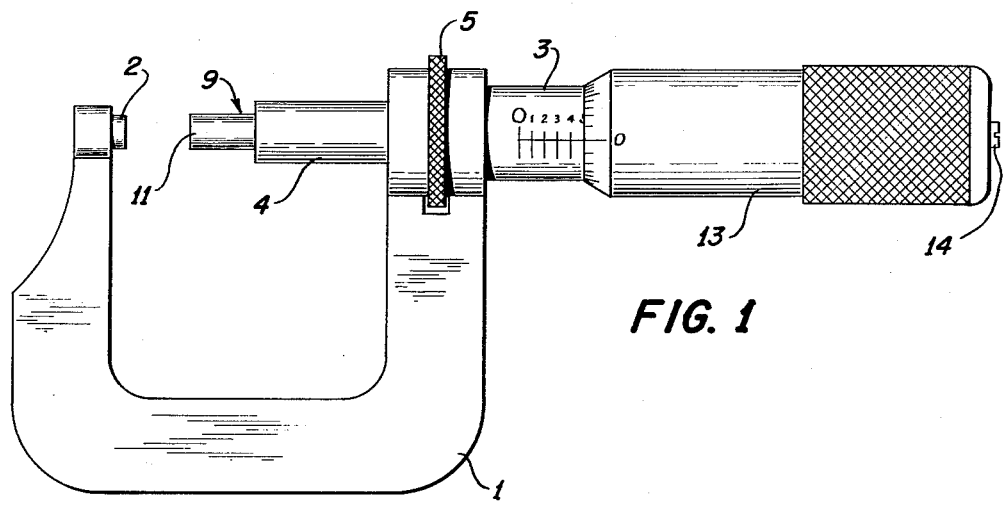
FIGURE 1 is a side elevation of the micrometer of the present invention.
Figure 2:
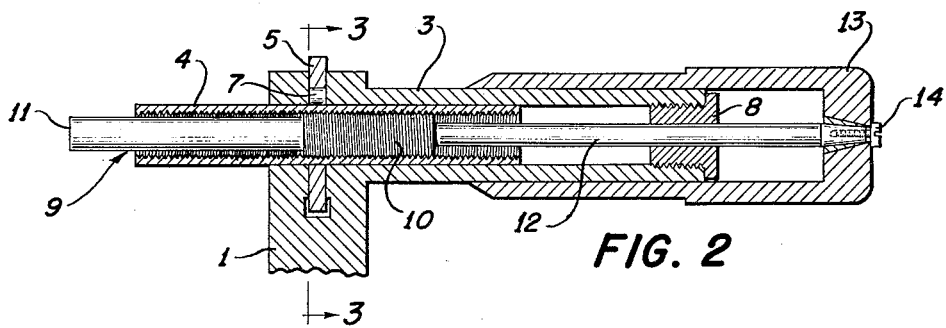
FIG. 2 is a fragmentary longitudinal section of the micrometer.

As best shown in FIGURE 1, the barrel is provided with a series of calibrations and similarly, the beveled edge 15 of the knob 13 is also provided with calibrations as in a conventional micrometer.

In operation of the micrometer, the article to be measured is initially disposed on the anvil 2 and the lock nut 5 is then loosened and the sleeve 4 and spindle 9 are slid forwardly within the barrel 3 until the inner end 11 of the spindle engages the article. The lock nut 5 is then tightened and the knob 13 is rotated to provide the final adjustment or measurement for the article.

As the sleeve 4 is slidable within the barrel 3, the inner end 11 of the spindle can be moved rapidly toward the anvil 2 to provide a coarse adjustment. This feature substantially reduces the amount of rotation and movement which would otherwise be necessary in order to move the spindle with respect to the anvil 2.

Due to the sliding connection between the sleeve and the barrel, the present micrometer can be used for measurements of several inches and thereby will replace a series of separate micrometers that are generally used to measure in one inch increments.

The micrometer of the invention is exceedingly simple in construction and may be readily adapted to existing equipment by merely inserting the sleeve and spindle within barrels of an existing micrometer.

Various modes of carrying out the invention are contemplated as being within the scope of the following claims particularly pointing out and distinctly claiming the subject matter which is regarded as the invention.

I claim:

1. A micrometer, comprising a yoke, an anvil mounted on one end of the yoke, a generally cylindrical barrel carried by the other end of the yoke and disposed in axial alignment with the anvil, a tubular internally threaded sleeve slidably disposed within the barrel, a lock nut to removably secure the sleeve to the barrel, stop means secured to the outer end of the barrel and extending radially inward of the barrel in position to be engaged by the outer end of the sleeve to prevent outward displacement of the sleeve from the barrel, said stop means having an axial opening therethrough, a spindle having a threaded portion threadedly engaged with the sleeve and having an inner end portion disposed to cooperate with the anvil to measure an article therebetween, said spindle having an outer end portion of reduced diameter disposed within said opening in said stop means and extending therebeyond, and a knob secured to the outer end of said spindle and slidably disposed with respect to the outer surface of the barrel, sliding movement of the sleeve within the barrel serving to move the spindle with relation to the anvil to provide a coarse adjustment of measurement of the article and rotation of said knob serving to move the spindle axially within the sleeve and provide a fine adjustment of measurement of the article.

2. A micrometer, comprising a yoke, an anvil mounted on one end of the yoke, a generally cylindrical barrel carried by the other end of the yoke and disposed in axial alignment with the anvil and having a circumferential recess, a tubular internally threaded sleeve slidably disposed within the barrel, an annular lock nut disposed within the recess and engageable with the outer surface of the sleeve to removably secure the sleeve to the barrel, a stop threadedly engaged within the outer end of the barrel and having an axial opening and disposed to be engaged by the outer end of the sleeve to prevent outward displacement of the sleeve from the barrel, a spindle having a threaded portion threadedly engaged with the sleeve and having an inner end portion disposed to cooperate with the anvil to measure an article therebetween, said spindle having an outer end portion of reduced diameter disposed within the opening in said stop and extending therebeyond, and a knob secured to the outer end of said spindle and slidably disposed with respect to the outer surface of the barrel, sliding movement of the sleeve within the barrel serving to move the spindle with relation to the anvil to provide a coarse adjustment of measurement of the article and rotation of said knob serving to move the spindle axially within the sleeve and provide a fine adjustment of measurement of the article.

References Cited in the file of this patent

UNITED STATES PATENTS 2,932,898  Enders _____ Apr. 19, 1960

FOREIGN PATENTS 341,197  Germany _____ Sept. 27, 1921